United States Patent
Zang et al.

(10) Patent No.: US 8,639,221 B1
(45) Date of Patent: Jan. 28, 2014

(54) ANONYMITY DETERMINATION FOR WIRELESS COMMUNICATION DEVICE USERS

(75) Inventors: Hui Zang, Cupertino, CA (US); Jean C. Bolot, Los Altos, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 13/561,191

(22) Filed: Jul. 30, 2012

Related U.S. Application Data (60) Provisional application No. 61/534,635, filed on Sep. 14, 2011.

(51) Int. Cl.
*H04M 1/66* (2006.01)

(52) U.S. Cl.
USPC .......................................................... 455/411

(58) Field of Classification Search
USPC .......................................................... 455/411
See application file for complete search history.

(56) References Cited

U.S. PATENT DOCUMENTS

| | | | |
|---|---|---|---|
| 2010/0064373 A1 | 3/2010 | Cai et al. | |
| 2010/0332339 A1* | 12/2010 | Patel et al. | 705/26 |

* cited by examiner

*Primary Examiner* — Temica M Beamer
*Assistant Examiner* — Joel Ajayi (57) ABSTRACT

What is disclosed is a method and system for determining an anonymity level of a user's data. If it desired to change the anonymity level, location and time information may be changed and/or deleted to effect the change. The change may be user directed, or may be achieved by the system, before providing the information to a third party.

20 Claims, 7 Drawing Sheets

ANONYMITY DETERMINATION FOR WIRELESS COMMUNICATION DEVICE USERS

RELATED APPLICATIONS

This application claims priority to provisional patent application Ser. No. 61/534,635 entitled "ANONYMITY DETERMINATION FOR WIRELESS COMMUNICATION DEVICE USERS" filed Sep. 14, 2011, which is hereby incorporated by reference, in its entirety, for all purposes.

TECHNICAL FIELD

Aspects of the disclosure are related to the field of communications, and in particular, determining a level of anonymity of collected data, presenting the level of anonymity to a user, and anonymizing data collected from wireless system users.

TECHNICAL BACKGROUND

A wireless communication network communicates over the air with wireless communication devices that are operated by mobile users. The wireless communication network may include cellular networks, Wi-Fi networks, as well as other networks.

The wireless communication network generates mobility data that indicates individual user movements and other data, based at least in part on their wireless device usage, time, and other considerations. The data may include location, time, Wi-Fi login, application downloads or any other information the system may be able to generate.

The wireless communication network provides the mobility data to third parties for ancillary uses, such as for marketing and product development, among other uses. Typically, the wireless communication network provides a user's mobility data in an anonymous manner. For example, the wireless communication network may replace a user's standard user ID with an encrypted and anonymous code. Others may change location information for the purpose of obscuring exact location information.

OVERVIEW

Systems, methods, and software for identifying the anonymity of data, anonymizing the data, and providing a user with information about the data of the user, are provided herein. In one example, a method of operating a communication system is provided. The method includes exchanging wireless communications with a plurality of wireless communication devices operated by a plurality of mobile users, determining mobility data for the plurality of mobile users based at least in part on the exchange of the wireless communications, for at least one mobile user of the plurality of mobile users, determining an anonymity factor from the mobility data indicative of a difficulty of identifying the one mobile user from at least the mobility data, and modifying at least a portion of the mobility data to effect a change in the anonymity factor.

In another example, a method of operating a communication system is provided. The method includes receiving mobility data generated from an exchange of wireless communications by a wireless communication system with a plurality of wireless communication devices operated by a plurality of mobile users, processing the mobility data to identify at least two most frequented locations associated with at least one mobile user of the plurality of mobile users, abstracting at least a portion of the mobility data corresponding to the at least two most frequented locations to increase anonymity of the mobility data with respect to at least the one mobile user, and transferring the mobility data with the increased anonymity to a mobility data processing system.

DETAILED DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

In a brief example, the wireless communication network generates mobility data that indicates individual user movements and other data, based at least in part on their wireless device usage, time, and other considerations. The wireless communication network provides the mobility data, with an encrypted user ID, to third parties for ancillary uses, such as for marketing and product development. Based on the amount and type of other user's data, a level of anonymity for each user's data can be determined. The data may be further anonymized, if desired, by a variety of methods before providing the data to third parties.

Mobility data for many users may be collected and analyzed to determine an anonymity level of a user's data. If it desired to change the anonymity level, location and time information may be changed and/or deleted to effect the change. The change may be user directed or may be achieved by the system before providing the information to a third party.

However, as the anonymization of the data increases, the value of the data to the third parties may decrease. Therefore, the amount of anonymization may also depend on the relative value of the anonymized data.

Figure 1:
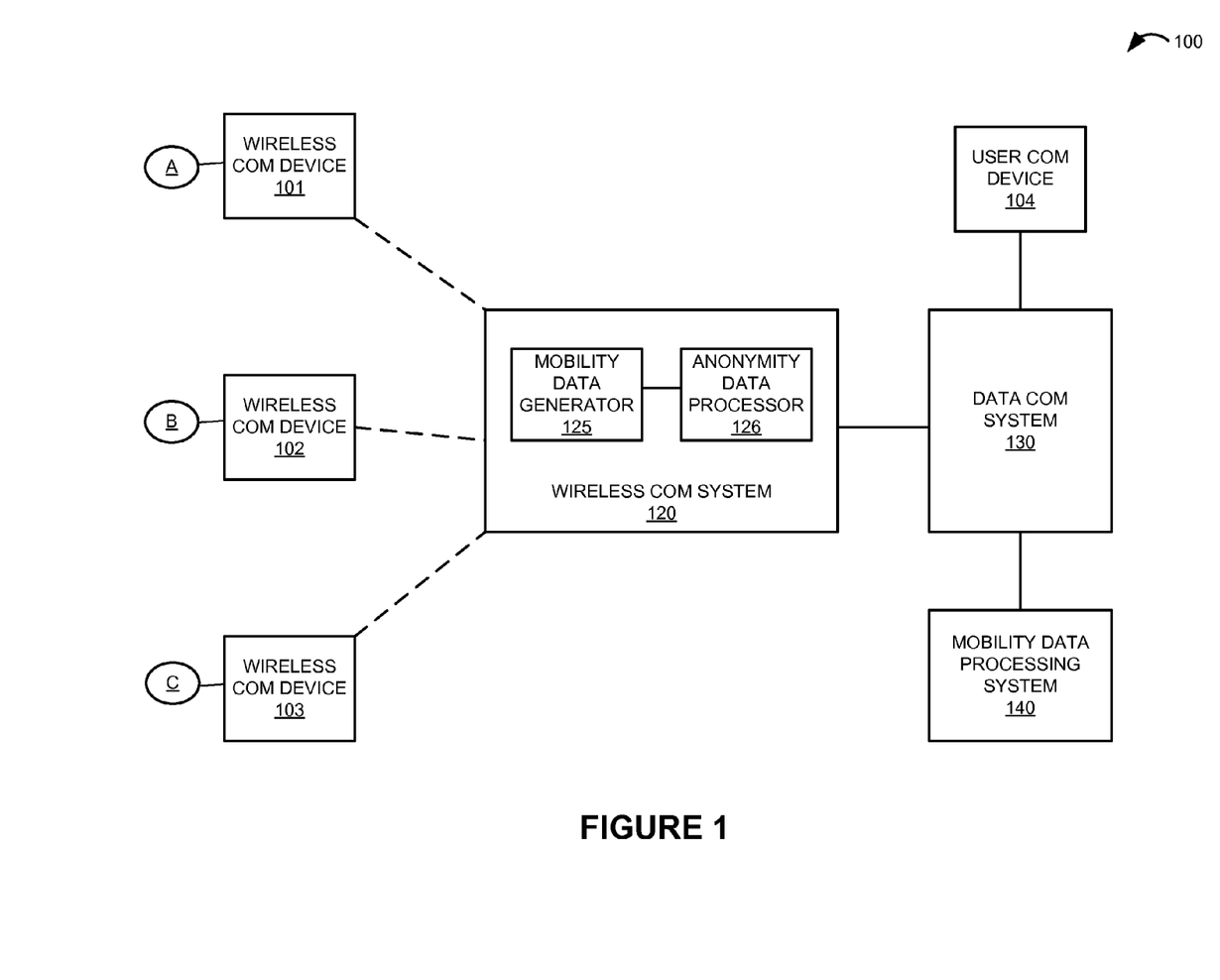
FIG. 1 illustrates a wireless communication environment, in an implementation.
Figure 2:
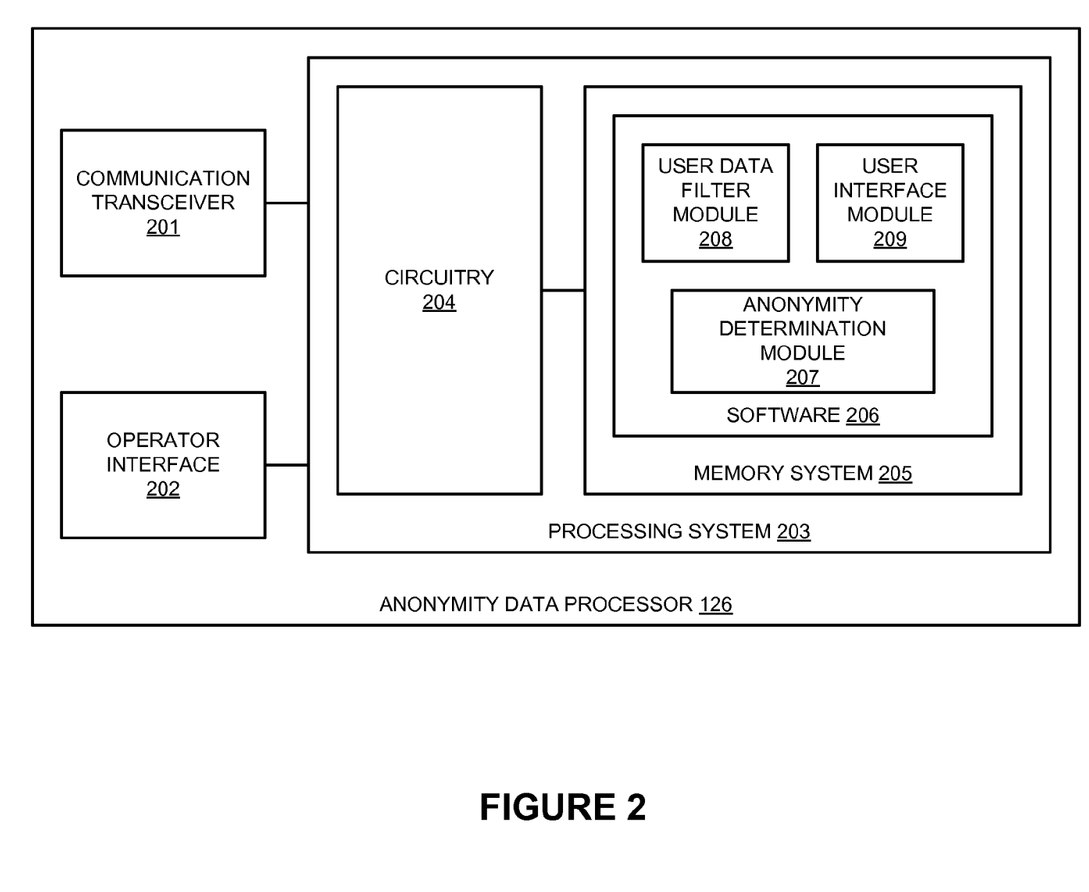
FIG. 2 illustrates an implementation of an anonymity processing system.
Figure 3:
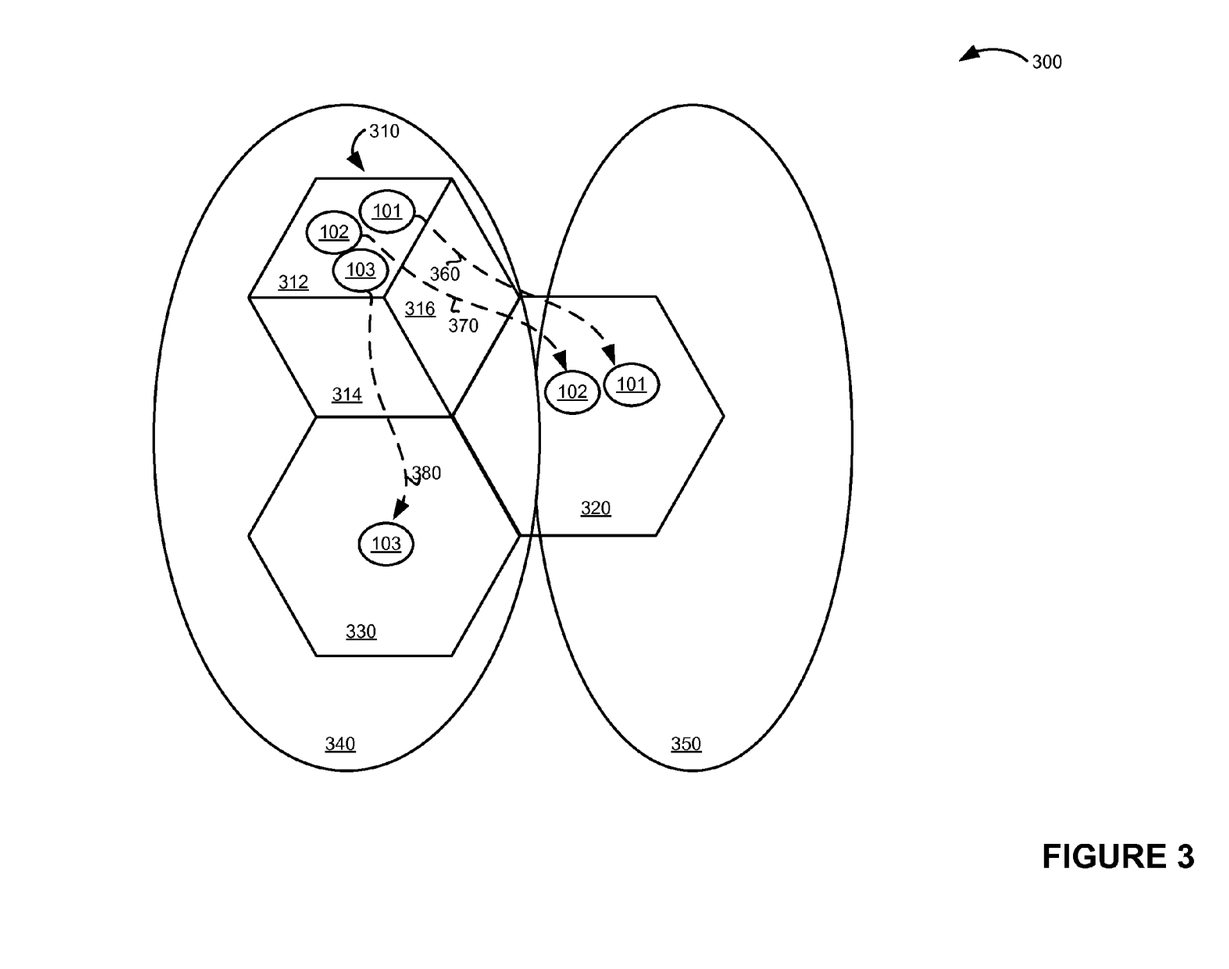
FIG. 3 illustrates a mobility diagram, in an implementation.
Figure 4:
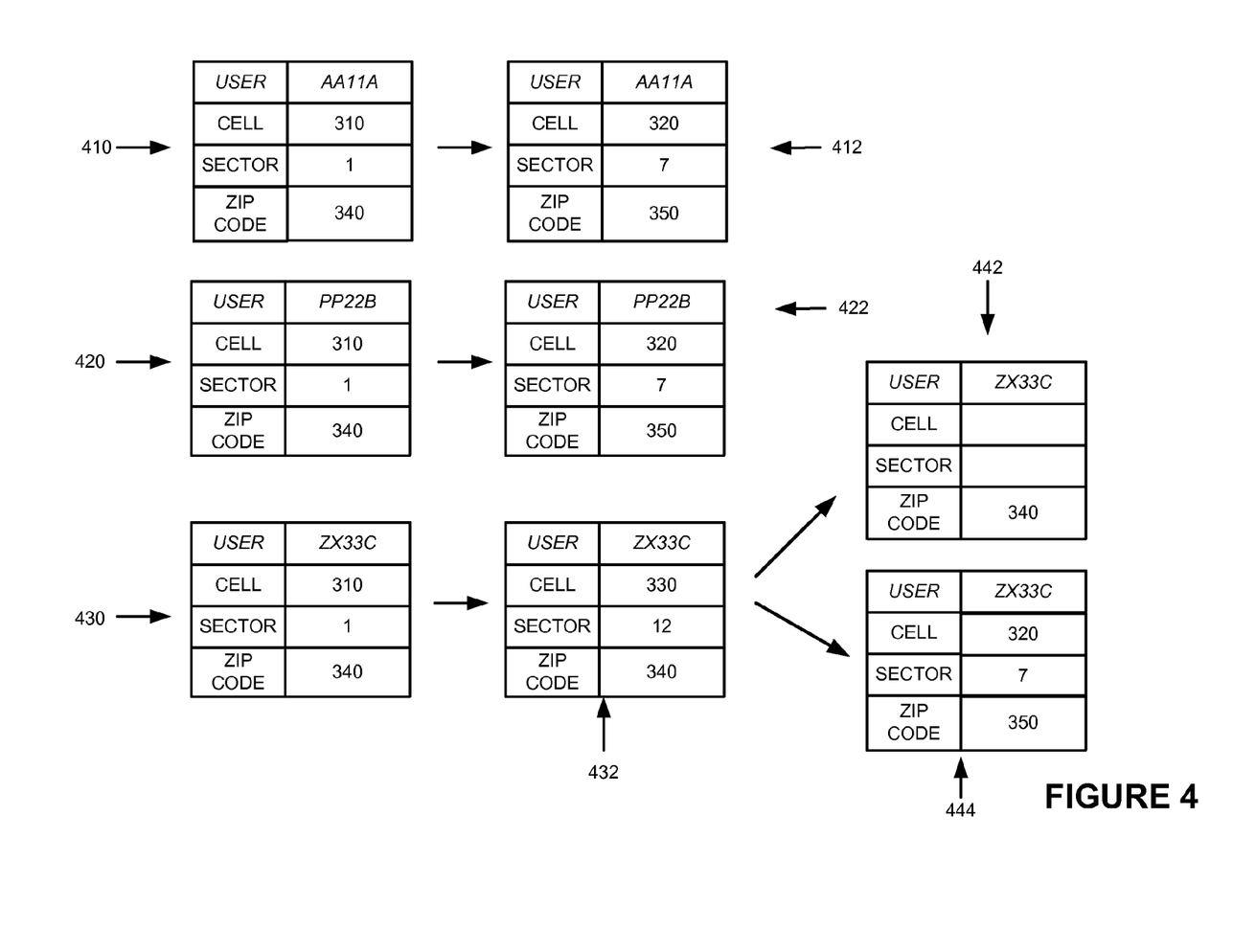
FIG. 4 illustrates mobility data, in an implementation, in an implementation.
Figure 5:
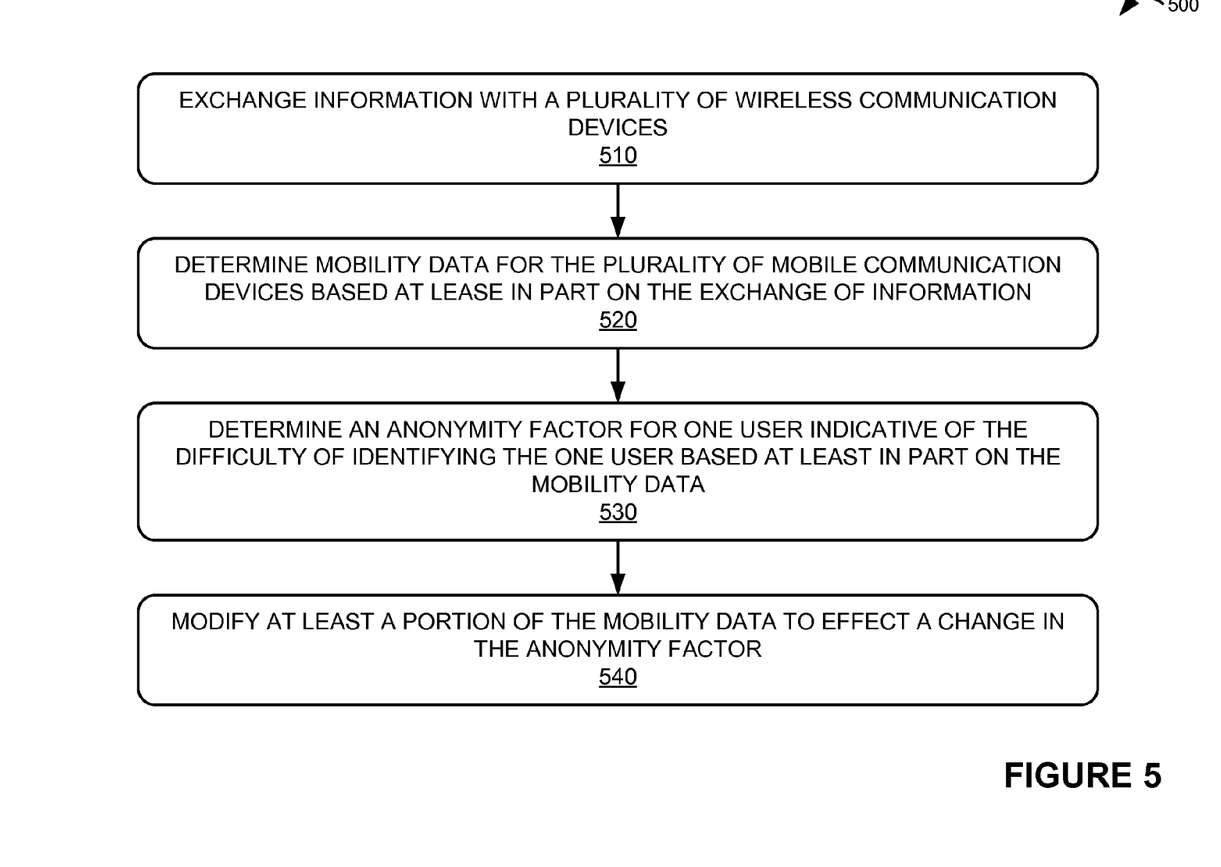
FIG. 5 illustrates a method of determining an anonymity factor by the wireless system, in an implementation.
Figure 6:
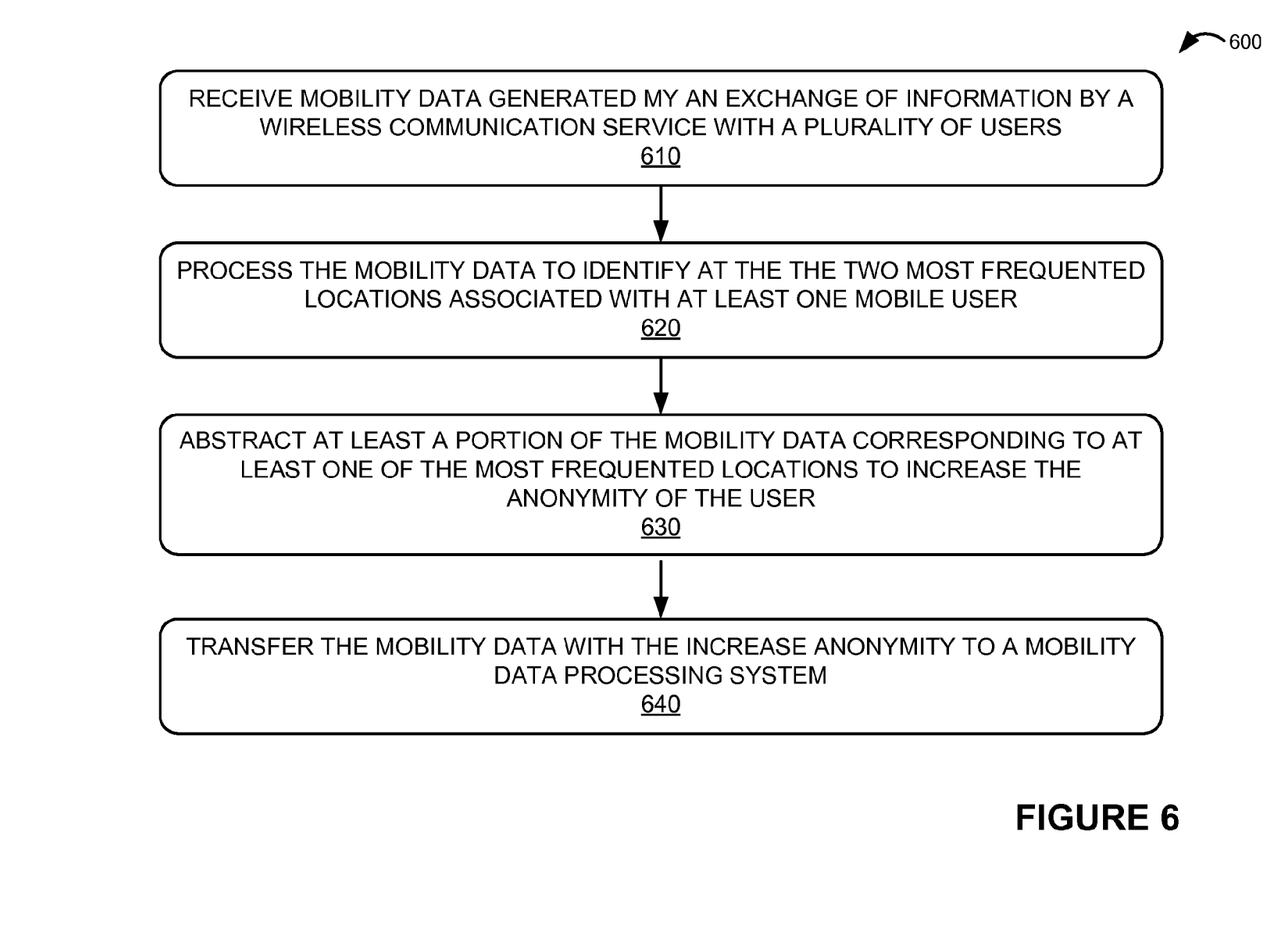
FIG. 6 illustrates a method of anonymizing data by an anonymity processor, in an implementation.
Figure 7:
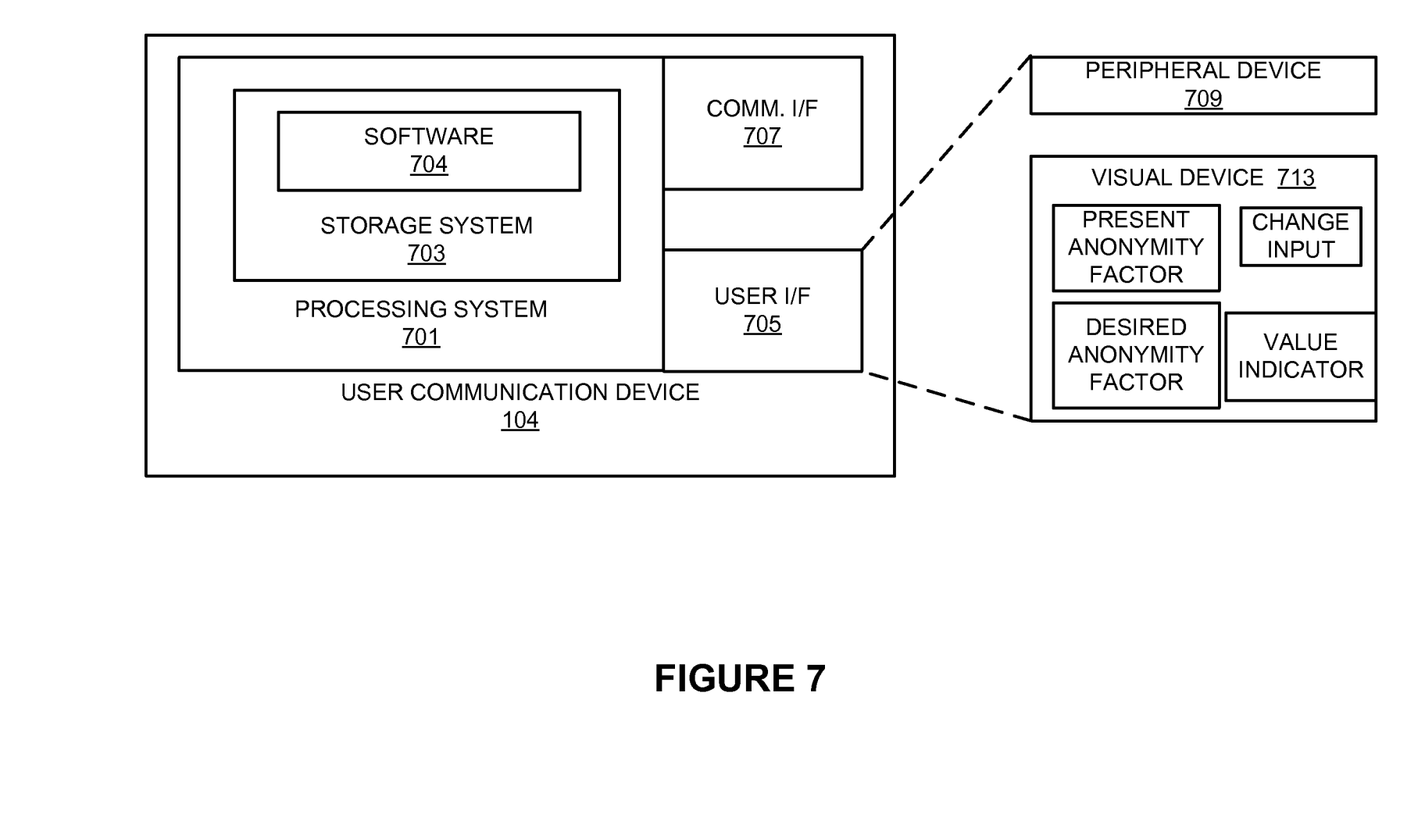
FIG. 7 illustrates communication device, according to an implementation.

Referring to the drawings, FIG. 1 illustrates a wireless communication environment for collecting, anonymizing, and providing mobility data. FIG. 2 illustrates a more detailed view of an anonymity processor for anonymizing data. FIG. 3 shows a mobility diagram and geographic location information used for mobility data. FIG. 4 shows sample event records of mobility data. FIG. 5 illustrates a method of determining an anonymity factor by the wireless system. FIG. 6 illustrates a method of anonymizing data by an anonymity processor. FIG. 7 illustrates communication device, according to an implementation.

Turning now to FIG. 1, a wireless communication environment 100 is illustrated. Wireless communication environment 100 includes wireless communication devices 101-103, user communication device 104, wireless communication system 120, data communication system 130, and mobility data processing system 140. Wireless communication system 120 includes mobility data generator 125 and anonymity data processor 126. Wireless communication system 120 may also include multiple wireless access points, communication links, network gateways, and control systems, although these components are not shown for brevity.

Wireless network protocols that may be utilized by wireless communication devices 101-103 and wireless communication system 120 include Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), Worldwide Interoperability for Microwave Access (WiMAX), IEEE 802.11 protocols (Wi-Fi), Bluetooth, Internet, telephony, or some other wireless network protocol.

Wireless communication devices 101-103 may be phones, computers, e-books, Internet appliances, game consoles, machine transceivers, and/or any other device capable of wireless communication. User A may generally be associated with wireless communication device 101. User B may generally be associated with wireless communication device 102. User C may generally be associated with wireless communication device 103.

User communication device 104 may comprise a computer or some other apparatus capable of data processing, which is shown in more detail in FIG. 7. Mobility data generator 125 and anonymity data processor 126 may comprise specially programmed computer systems. Data communication system 130 comprises the Internet or some other data communication network, or collection of networks. Mobility data processing system 140 may comprise a computer and communication system capable of obtaining and using anonymous user mobility data.

In operation, wireless communication system 120 exchanges wireless communications with wireless communication devices 101-103, which are operated by a mobile users A, B, and C. In a scenario, users A, B, and C and devices 101-103 move about as they communicate, and mobility data generator 125 is configured to track individual devices via event records which may include movements by tracking by time, sector, base station, global positioning system (GPS), Wi-Fi connection, and the like that is related to the usage, or any other information the system may be able to collect. Thus, mobility data generator 125 determines mobility data for the users of devices 101-103 based at least in part on their exchange of wireless communications, or other event(s).

For the user of wireless communication device 101, anonymity data processor 126 processes the mobility data for device 101 (and its user A) to determine an anonymity factor. The anonymity factor may indicate a difficulty of identifying the user from the mobility data for device 101 and/or user A. In some examples, the anonymity factor is determined on a scale from 1 to 5 where a "1" indicates that it would be very easy to match a user with their mobility data—and thus to determine the past whereabouts of the user. An anonymity factor of 5 would indicate that it would be very difficult to match a user with their mobility data. It will be appreciated that many other methods may be used to measure the factor and assign it a number or level such that changes to that level may be accomplished. Such different methods and systems are encompassed by this disclosure and the claims.

If the anonymity factor for the user A of device 101 falls below a threshold, (such as 3 in the above example), then anonymity data processor 126 abstracts the mobility data for the user of device 101 to improve their anonymity factor above the threshold. For example, processor 126 might replace base station sector locations with corresponding zip code locations. Thus, processor 126 could lessen the resolution of the location data used to indicate user movements. In another example, processor 126 might restrict the user data by a time period used to collect the data. Thus, processor 126 might replace one month of user data associated with a single anonymous user ID with four one-week sets of user data that are each associated with a different anonymous user ID.

Anonymity data processor 126 may repeat the above abstraction process for the users of wireless communication devices 102-103. Anonymity data processor 126 may then be capable of transferring the abstracted mobility data to mobility data processing system 140. Note that the mobility data for some users may not require any abstraction. Also note that the mobility data for some users may be changed and/or deleted to create abstraction.

In another operation, a user operates communication device 104 to access anonymity data processor 126 over data communication system 130. The user transfers information about themselves to system 120, where this user information includes the locations most frequented by the user—typically a home location and a work location. The user information may also indicate an amount of wireless communications used by the user, such as the number of calls, text messages, or web site visits per day. In some cases, the user information transfer comprises a user authorization to access user location and usage records that are already stored by wireless communication system 120.

Anonymity data processor 126 processes the user data to determine an anonymity factor for the user. The anonymity factor indicates a difficulty of identifying the user from their mobility data. In some examples, the anonymity factor is determined on a scale from 1-5 where a "1" indicates that it would be very easy to match a user with their mobility data, and an anonymity factor of 5 would indicate that it would be very difficult to match a user with their mobility data.

Anonymity data processor 126 transfers the anonymity factor to the user. In some cases, processor 126 also recommends techniques to improve the anonymity factor, such as by lowering the resolution of their location data or by shortening the time frame for the location data sets associated with each anonymous ID. The system may also ask the user what level of abstraction in acceptable, then abstract the data to achieve the indicated level of anonymity.

To determine the anonymity factor, anonymity data processor 126 may compare the user's mobility data with other mobility data for other users to determine the uniqueness of the user's mobility data. Other sources such as social media, websites, telephone directories, and other information about the user may be used to augment the event record data.

For example, if no other users live and work at the user's home and work locations, and if the user engages in a significant amount of mobile communications, then the user would have a low anonymity factor—indicating that the user is easy to identify from their anonymous mobility data. In a contrasting example, several other users may live and work at the user's home and work locations, and the user may not engage in a significant amount of mobile communications. In this case, the user would have a high anonymity factor—indicating that the user may be relatively difficult to identify from their mobility data. Anonymity data processor 126 may perform linear regression to best fit user data to existing user data curves to determine their most likely anonymity factor. It will be appreciated that many other techniques may be used to determine a user's anonymity factor without straying from the scope of this disclosure.

FIG. 2 illustrates anonymity data processor 126, which includes communication transceiver 201, operator interface 202, and processing system 203. Processing system 203 is linked to communication transceiver 201 and operator interface 202. Processing system 203 may include processing circuitry 204 and memory system 205 capable of storing operating software 206. Operating software 206 may include software modules 207-209.

Communication transceiver 201 may include components that communicate over communication links, such as network cards, ports, RF transceivers, processing circuitry and software, or some other communication components. Communication transceiver 201 may be configured to communicate over metallic, wireless, optical, or any other link(s). Communication transceiver 201 may be configured to use TDM, IP, Ethernet, optical networking, wireless protocols, communication signaling, or some other communication format—including combinations thereof.

Operator interface 202 comprises components to allow an operator to interface with wireless communication system 120. These components typically include a keyboard, display, indicator lights, speakers, touch pads, and the like.

Processing circuitry 204 comprises microprocessor and other circuitry that is capable of retrieving and executing operating software 206 from memory system 205. Memory system 206 comprises a disk drive, flash drive, data storage circuitry, and/or some other memory apparatus. Operating software 206 comprises computer programs, firmware, and/or some other form of machine-readable processing instructions. Operating software 206 may include an operating system, utilities, drivers, network interfaces, applications, or some other type of software. In this example, operating software 206 comprises software modules 207-209, although software 206 could have alternative configurations in some examples.

When executed by circuitry 204, operating software 206 directs processing system 203 to operate as described herein for wireless communication system 120. In particular, anonymity determination module 207 compares user mobility data to a large mobility data set for other users, and uses at least that information to determine their anonymity factor. User data filter module 208 may then abstract the user mobility data that falls below an anonymity threshold by changing the resolution of location data and/or shortening the time frame for each anonymous data set, among other ways to abstract the data. User interface module 209 interacts with users to obtain user data and to transfer anonymity factors and recommendations, as well as receive selections and/or other input from the user.

FIG. 3 illustrates a mobility diagram 300, which illustrates movements of wireless communication devices 101, 102, and 103, which may correspond to three different users A, B, and C. These movements of the wireless communication devices, 101, 102, and 103 are captured in event records discussed with respect to FIG. 4. Mobility diagram 300 includes coverage area 1 (310), coverage area 2, (320) and coverage area 3 (330). As shown in FIG. 3, each coverage area 310-330 has a limited geographic range over which wireless access is provided to wireless communication devices. The limited range is indicated by the hexagonal-shaped wireless coverage area 310-330 in FIG. 3. It will be appreciated that the coverage areas may overlap. Although a hexagonal region defining the coverage areas is shown in FIG. 3, it should be understood that the coverage areas could be of other shapes and configurations, as determined by geographic features, empirical data, radio frequency (RF) conditions, the associated equipment, or by other factors, including combinations thereof.

Although not shown for clarity, a base station or other base station equipment in each of coverage areas 310-330 provides wireless communication access for wireless communication devices that may be located within each respective coverage area. Base station equipment could include RF communication and control circuitry and antennas, and includes wireless communications equipment capable of communicating with and providing communication service to wireless communication devices. Each coverage area 310-330 could include further wireless communication equipment and systems.

As shown coverage area 310 includes sectors 312, 314, 316. Sectors may be generally ⅓ of each coverage area. Coverage areas 320 and 330 also have sectors, which are not labeled for simplicity of FIG. 3.

FIG. 3 also illustrates zip code areas 340 and 350. Coverage areas 310-330 may fall in portions of two or more area codes, or are included entirely within, zip code areas 340 and 350. Coverage areas 310, 320, 330 are generally smaller than zip code areas 340, 350.

FIG. 3 also shows wireless communication devices 101, 102, and 103, corresponding to users A, B, and C. The users of wireless communication devices 101, 102, and 103 may have one or more location(s) frequented in which they often use wireless communication devices. As shown, all of the users in this figure generally have one frequented location within the same sector 312 of coverage area 310, within zip code 340.

The user of wireless communication device 101 may generally follow path 360 to arrive at another general area where usage is frequent in coverage area 320 and zip code 350. These two frequented areas may be home and work for many users. The user of wireless communication device 102 may generally follow path 370 to get to the same general area where usage is frequent in coverage area 320 and zip code 350. The user of wireless communication device 103 may generally follow path 380 to get to another general area where usage is frequent in a sector of coverage area 330 and zip code 340.

The movement and usage of the wireless communication devices with the wireless system 120 (FIG. 1) may cause event records to be generated. FIG. 4 illustrates types of event records generated by mobility data generator 125 from the movement and usage shown in FIG. 3.

FIG. 4 illustrates event records corresponding to the movements of the users of the wireless communication devices in FIG. 3. The user information of the event records has been anonymized, but has been given somewhat meaningful identifiers for the ease of explanation. Event record 410 and event record 412 may correspond to the movements of the user A of wireless communication device 101. Event record 410, may correspond when the user of communication device 101 (FIG. 4) initiates a wireless communication from sector 312 of cell 310, within zip code 340. Event record 412, may correspond when the user of communication device 101 (FIG. 4) initiates a wireless communication from a sector of cell 320, within zip code 350.

Similarly, event record 420 may correspond when the user B of communication device 102 (FIG. 4) initiates a wireless communication from sector 312 of cell 310, within zip code

340. Event record 422, may correspond when user B of communication device 102 (FIG. 4) initiates a wireless communication from a sector of cell 320, within zip code 350.

Event record 430, may correspond when user C of communication device 103 (FIG. 4) initiates a wireless communication from sector 312 of cell 310, within zip code 340. Event record 432, may correspond when user C of communication device 103 (FIG. 4) initiates a wireless communication from a sector of cell 330, within zip code 340.

It will be appreciated that these event records may show particular moments in time, and many such records may be created for a single communication over the wireless system. Many event records may be generated for the user of communication device 103 while the user is travelling along path 380. As shown, an event record may include the user identification, cell, sector and zip code information. It will be appreciated that other information may be included in an event record.

In this instance, event records 410 and 420, as well as 412 and 422 will be very similar because the users of communication devices 101 and 102 have similar frequented locations. If the user name is anonymized, their identities will be somewhat more difficult to determine. Event record 432 is much different than the other event records in FIG. 3, such that, if the user name or number of the user of communication device 103 is anonymized, it still would be relatively easier to determine the identity of the user from the sector and cell of the frequented locations of that user.

FIG. 4 also shows a few anonymized event records 442, and 444, which are abstracted event records from event record 432. This different event records 442 and 444 show some ways of anonymizing the data in an event record. Event record 442 may be anonymized by eliminating of data of event record 432. The sector and cell identification have been eliminated, thereby reducing the possibility that one of the frequented locations by the user of communication device 103 is less likely to be determined. This may make it less likely that the user of communication device 103 may be identified from the information found in the event records of that user.

Another method of anonymizing the event record of the user of communication device 103 may be to eliminate a time period of various records of that user (not shown). For Example, the event records including the location information of cell 330 and zip code 340 may be eliminated to obscure that location frequented by user C. This may also generally anonymize one or more of the frequented locations of user C, thereby making it more difficult to identify the user C from the event records.

Event record 444 shows changing of data to anonymize event record 432. As shown, the cell, sector and zip code data may be changed to make the user of communication device 103 have similar patterns to the user of communication devices 101 and 102, thereby making it more difficult to identify the user of communication device 103 based on the event records of that user. Furthermore, the event record may include changing data and eliminating data, (not shown). In this example, the sector and cell information may be eliminated and the zip code changed to be more like the event records from the user of other communication devices.

The relative value of event record 432 may be highest as compared to event records 442 and 444 because only the user ID has been anonymized. All other information in event record 432 is accurate according to the actual events. Event record 444 may have the least value compared to event records 432 and 442, because the user ID has been anonymized and all of the location information has been changed and is not accurate. Event record 442 may have relative intermediate value when compared to event records 432 and 444 because some location information has been eliminated but the zip code location information is correct.

A user may be shown the anonymity factor and value such that when the anonymity value changes the value changes. Furthermore, the user may also be presented with examples or exactly how the data appears with the corresponding anonymity factor and/or corresponding value. As in record 442, the data may show only the user and the zip code when the anonymity factor is relatively high as compared with event record 432.

It will be understood that this information, data, and/or functionality may also be presented to a third party, such as a wireless communications company that collects the data. This would allow a third party to anonymize and/or de-anonymize the data and view the corresponding value, and what the data may look like.

As discussed in the white paper "Anonymization of Location Data Does Not Work: A Large-Scale Measurement Study", if the top two frequented locations are known, the identity of the user may be relatively easy to determine, even if the user ID or cellular telephone number is anonymized. It is much more difficult to determine the identity of a user if only one frequented location is known. Therefore, if the event record data is anonymized such that only one frequented location is discernable from the data, a user may be much more difficult to identify from the event records. Location data may be eliminated or changed to anonymize one or more frequented locations and thereby further anonymize the user.

FIG. 5 is a flow diagram illustrating a method 500 of operation of wireless communication environment 100. Method 500 includes exchanging wireless communications by a wireless communication system 120 with a plurality of wireless communication devices 101, 102, and 103 operated by a plurality of mobile users A, B, and C at step 510. The communications may be any contact the wireless system may have with the wireless communication devices, including but not limited to, a cell phone call, an attempt to connect to the system, an attempt to make a Wi-Fi connection, GPS information, a search initiated on the wireless communication device, application download, etc.

Based at least in part on the communication, mobility data is created and/or determined by mobility data generator 125 at step 520. As shown in FIG. 4, the mobility data may be in the form of an event record. Event records may include call data records, as well as many other types of records or information.

An anonymity factor is determined by anonymity data processor 126 (at step 530), based at least in part on the mobility data. The anonymity factor may be indicative of the difficulty of identifying the one mobile user from the mobility data of the user. The factor may also be based on the mobility data of other users compared to the mobility data of any particular user.

The mobility data is modified by anonymity data processor 126 at step 540. This modification may cause a change in the anonymity factor, once recalculated, to make it more or less difficult to identify a particular user from the mobility data of that user. The modification may be made if the anonymity factor indicates that user may be relatively easily identifiable from the mobility data of the user. The modification may be made when the anonymity factor is below a predetermined threshold to increase the anonymity factor. This may make the user more difficult to identify based on the modified data and recalculated anonymity factor. The abstracted data may be sent to a mobility data processing system, which may include a processor which uses the mobility data for various purposes, including marketing.

The anonymity factor may be presented to the user via user communication device 104, along with various indications of how to change the anonymity factor. The user may indicate to make their data more anonymous via user communication device 104, and may indicate how the data is to be anonymized. The system may then change the data to change the anonymity factor based on the indication from the user. The system may also increase the anonymity without user input.

FIG. 6 is a flow diagram illustrating a method 600 of operation of wireless communication system 120. Method 600 includes receiving mobility data generated from an exchange of wireless communications by a wireless communication system 120 with a plurality of wireless communication devices operated by a plurality of mobile users at 610. The communications may be any contact the wireless system may have with the wireless communication devices, including but no limited to, a cell phone call, an attempt to connect to the system, an attempt to make a Wi-Fi connection, GPS information, a search initiated on the wireless communication device, application download, etc.

The mobility data is processed (at step 620) to identify at least two most frequented locations associated with at least one mobile user of the plurality of mobile users by anonymity data processor 126. As noted above, if two frequented locations for a user are known, it may be relatively easy to identify the user based at least in part on the mobility data of the user.

The mobility data is abstracted by anonymity data processor 126 (at step 630) with respect to at least one of the two locations of the one user to better anonymize the data. As noted above, this may make it more difficult to identify a user from the abstracted data. The mobility data is transferred (at step 640) to the mobility data processing system 140 by anonymity data processor 126 for use by that system. Elimination may include eliminating data from an event record, and/or eliminating the event record entirely.

The abstracting may include reducing the granularity of the location information. His may be accomplished by changing and/or eliminating data. The location information may be eliminated, such as cell and sector information, and/or changed, which may include changing the sector, cell and zip code information. Furthermore, certain event records may be eliminated to obscure the location information for at least one of the frequented locations of the user.

An anonymity factor may also be calculated for the mobility data by anonymity data processor 126. The mobility data may be abstracted based on the anonymity factor by anonymity data processor 126, and another anonymity factor may be calculated based on the abstracted mobility data by anonymity data processor 126. The new anonymity factor is used to determine if the abstracted mobility data meets anonymity criteria, or if more abstraction is needed to make it more difficult to identify a user based on the abstracted mobility data. The anonymity factor may be presented to a user via user communication device 104, and the user may indicate the data should be further anonymized.

FIG. 7 is a detailed depiction of user communication device 104, according to an implementation. User communication device 104 could use alternative configurations. Communication device 104 includes processing system 701, storage system 703, software 704, user interface 705, and communication interface 707. It should be understood that some elements could be omitted. Processing system 701 is linked to storage system 703, user interface 705, and communication interface 707. Storage system 703 stores software 704, executable in operation by processing system 701.

Communication interface 707 comprises a network card, network interface, port, or interface circuitry that allows user communication device 104 to communicate with other communication devices over a variety of networks. Communication interface 707 may also include a memory device, software, processing circuitry, or some other device. Communication interface 707 may use various communication protocols, such as time division multiplex, internet, Ethernet, wireless, or some other communication format—including combinations thereof—to exchange communications as described herein for communication devices, such as anonymity factor and changes to the anonymity factor and mobility data.

User interface 705 comprises components that interact with a user to receive user inputs and user communications and to present media and/or information. User interface 705 may include a speaker, microphone, buttons, lights, display screen, mouse, keyboard, or some other user input/output apparatus—including combinations thereof.

In this embodiment, user interface 705 includes a peripheral device 709 and a visual device 713. Peripheral device 709 could be any device that can receive or output user communications, such as a keyboard, mouse, or other such device. Visual device 713 is any device capable of displaying images to a user, including the present anonymity factor, a desired anonymity factor, and a change input for changing the desired anonymity factor. An example of a visual device 713 is a display screen.

The present anonymity factor may be displayed to a user, and the user may select a desired anonymity factor via the change input. With this user communication device 104, a user may be presented with an anonymity factor for the data of the user, and have the ability to indicate a change in the anonymity factor they would like completed. The system may take this input and anonymize or de-anonymize the data accordingly.

A value indicator may also be displayed which generally indicates a value of the user data at the corresponding anonymity factor. As noted above, the more anonymous the information, the less useful and valuable the information may be to third parties. User communication device 104 may allow a user to see relatively how anonymous their data is, and a relative value to third parties.

Processing system 701 may comprise a microprocessor and other circuitry that retrieves and executes software 704 from storage system 703. Storage system 703 comprises a disk drive, flash drive, data storage circuitry, or some other memory apparatus. Processing system 701 is typically mounted on a circuit board that may also hold storage system 703 and portions of communication interface 707 and user interface 705.

Software 704 comprises computer programs, firmware, or some other form of machine-readable processing instructions. Software 704 may include an operating system, utilities, drivers, network interfaces, applications, virtual machines, or some other type of software. When executed by processing system 701, software 704 directs processing system 701 to operate communication device 700 to perform as described herein for communication devices, including communication device 104.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. Not all acts illustrated in a methodology may be required for a novel implementation.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless communication system, the method comprising:
   exchanging information with a plurality of wireless communication devices operated by a plurality of mobile users;
   determining mobility data for the plurality of mobile users based at least in part on the exchange of the information, wherein the mobility data comprises event records associated with the plurality of mobile users;
   for at least one mobile user of the plurality of mobile users, determining an anonymity factor based at least in part on the mobility data, the anonymity factor being generally indicative of a difficulty of identifying the one mobile user from at least the mobility data; and
   modifying at least a portion of an event record of the at least one mobile user to effect a change in the anonymity factor, with the modifying comprising changing or deleting at least a location data of an event record field.

2. The method of claim 1 further comprising:
   determining if the anonymity factor falls below a threshold;
   wherein modifying the at least a portion of the event record to effect the change in the anonymity factor occurs in response to the anonymity factor falling below the threshold.

3. The method of claim 2 wherein the change in the anonymity factor comprises an increase in the anonymity factor nearer to or above the threshold.

4. The method of claim 1 wherein modifying the portion of the event record comprising abstracting the portion of the event record to generate an abstracted event record.

5. The method of claim 4 wherein the event record includes the location data and wherein abstracting the portion of the event record comprises selecting a time limited subset of the location data to generate the abstracted event record.

6. The method of claim 4 further comprising transferring the abstracted event record to a mobility data processing system.

7. The method of claim 4 wherein abstracting the portion of the event record comprises reducing a granularity of the location data to generate the abstracted event record.

8. The method of claim 7 wherein the reducing the granularity of the location data comprises changing the cell location to a zip code location.

9. The method of claim 1 further comprising transferring a representation of the anonymity factor for presentation to the one mobile user.

10. The method of claim 9 further comprising:
    receiving a user selection indicative of the change in the anonymity factor;
    wherein modifying the at least a portion of the event record to effect the change in the anonymity factor occurs based at least in part on the user selection.

11. A method of operating a mobility data anonymity processor, the method comprising:
    receiving mobility data generated from an exchange of information by a wireless communication system with a plurality of wireless communication devices operated by a plurality of mobile users, wherein the mobility data comprises event records associated with the plurality of mobile users;
    processing the mobility data to identify at least two most frequented locations associated with at least one mobile user of the plurality of mobile users;
    abstracting at least a portion of an event record of the at least one mobile user corresponding to at least one of the at least two most frequented locations to increase anonymity of the event record with respect to at least the one mobile user, with the abstracting comprising changing or deleting at least a location data of an event record field; and
    transferring the event record with the increased anonymity to a mobility data processing system.

12. The method of claim 11 wherein abstracting at least the portion of the event record comprises reducing a granularity of the location data.

13. The method of claim 11 wherein abstracting at least the portion of the event record comprises limiting the event record with the increased anonymity to a reduced time frame.

14. The method of claim 11 further comprising:
    processing the event record to determine a measured value of an anonymity factor for the one mobile user indicative of a difficulty of identifying the one mobile user from at least the event record; and
    identifying a desired value of the anonymity factor associated with the one mobile user.

15. The method of claim 14 wherein abstracting the at least a portion of the event record corresponding to the at least two most frequented locations to increase the anonymity of the event record with respect to the at least the one mobile user comprises abstracting the at least a portion of the event record to change the measured value of the anonymity factor to the desired value.

16. The method of claim 15 further comprising:
    determining if the measured value of the anonymity factor falls below a threshold;
    wherein abstracting at least the portion of the event record occurs in response to the measured value falling below the threshold.

17. The method of claim 15 further comprising transferring a representation of the measured value of the anonymity factor for presentation to the one mobile user.

18. The method of claim 17 further comprising receiving a response that includes a user selection indicative of the desired value of the anonymity factor.

19. A computer apparatus comprising:
    user interface software that when executed by the processing system directs the processing system to receive an indication of an anonymity threshold;
    anonymity determination software that when executed by a processing system directs the processing system to, for at least one mobile user of a plurality of mobile users, determine an anonymity factor from mobility data indicative of a difficulty of identifying the one mobile user from at least the mobility data, wherein the mobility data comprises event records associated with the plurality of mobile users, and determine when the anonymity factor falls below the anonymity threshold; and user data software that when executed by the processing system directs the processing system to abstract at least a portion of an event record of the at least one mobile user to raise the anonymity factor nearer to or above the anonymity threshold, with the abstracting comprising changing or deleting at least a location data of an event record field; and a non-transitory computer readable storage medium having the user interface software, the anonymity determination, and the user data software stored thereon.

20. The computer apparatus of claim 19 wherein to abstract at least the portion of the event record the user data software directs the processing system to reduce a granularity of the event record.

* * * * *